(12) United States Patent
Nayfeh et al.

(10) Patent No.: US 7,986,860 B2
(45) Date of Patent: Jul. 26, 2011

(54) LASER GENERATED SYNTHETIC MEGA SCALE APERTURE FOR SOLAR ENERGY CONCENTRATION AND HARNESSING

(75) Inventors: Taysir H. Nayfeh, Cleveland, OH (US);
Daniel E. Raible, Westlake, OH (US);
Brian R. Fast, Baltimore, OH (US)

(73) Assignee: Cleveland State University, Cleveland, OH (US)

( * ) Notice: Subject to any disclaimer, the term of this patent is extended or adjusted under 35 U.S.C. 154(b) by 335 days.

(21) Appl. No.: 12/328,899

(22) Filed: Dec. 5, 2008

(65) Prior Publication Data
US 2009/0171477 A1 Jul. 2, 2009

Related U.S. Application Data

(60) Provisional application No. 61/012,537, filed on Dec. 10, 2007.

(51) Int. Cl.
*G02B 6/26* (2006.01)
*G02B 6/12* (2006.01)
(52) U.S. Cl. ............................................. 385/27; 385/14
(58) Field of Classification Search .................... 385/27, 385/14
See application file for complete search history.

(56) References Cited

U.S. PATENT DOCUMENTS

| | | | | |
|---|---|---|---|---|
| 4,991,509 A | * | 2/1991 | Smith | 102/213 |
| 5,313,263 A | * | 5/1994 | Abbiss et al. | 356/28.5 |
| 6,751,532 B2 | * | 6/2004 | Inokuchi | 701/14 |
| 2003/0009268 A1 | * | 1/2003 | Inokuchi | 701/14 |
| 2004/0263959 A1 | * | 12/2004 | Dixon et al. | 359/385 |
| 2005/0111515 A1 | * | 5/2005 | Diels | 372/104 |

* cited by examiner

*Primary Examiner* — K. Cyrus Kianni
(74) *Attorney, Agent, or Firm* — Fay Sharpe LLP

(57) ABSTRACT

Systems and methods are described that employ high-intensity lasers to set up a thin plasma sheet, also called a waveguide or "hot shell", in the atmosphere as a function of beam intensity and geometry. A laser beam can be spread and directed with physical optics (e.g., lenses, mirrors, other optical elements, etc.) to generate a thin inverted cone-shaped hot shell waveguide in the atmosphere. The hot shell of the waveguide has a different index of refraction (n) from that of the surrounding air layers and as such serves to internally reflect portions of the entering solar rays entering an aperture in the hot shell, toward the tip of the cone and a solar energy storage component positioned there, thus providing a virtual solar energy concentration system. In another embodiment, the solar energy storage component shuts down or otherwise rejects incoming solar energy when fully charged, to mitigate damage to system components.

14 Claims, 12 Drawing Sheets

MATCH TO FIG.13B

| ΔT (°C = °K) | INPUT DURATION (SECONDS) | APERTURE HEIGHT (METERS) | LEVEL NAME | AVERAGE AIR PRESSURE (PASCALS) | PARTIAL DRY AIR DENSITY (kg/m³) | PARTIAL HUMID AIR DENSITY¹ (kg/m³) | AVERAGE AIR DENSITY (kg/m³) |
|---|---|---|---|---|---|---|---|
| 1 | 1 | 1,000 | TROPOSPHERE | 95,600 | 1.15579 | 0.00577 | 1.16156 |
| 1 | 1 | 2,000 | TROPOSPHERE | 90,410 | 1.09305 | 0.00577 | 1.09682 |
| 1 | 1 | 11,000 | TROPOPAUSE | 61,797 | 0.99561 | 0.00001 | 0.99652 |
| 1 | 1 | 15,000 | TROPOPAUSE | 56,685 | 0.91149 | 0.00001 | 0.91150 |
| 1 | 1 | 20,000 | STRATOSPHERE | 53,400 | 0.85867 | 0.00001 | 0.85858 |
| 1 | 1 | 26,000 | STRATOSPHERE | 51,739 | 0.83196 | 0.00001 | 0.83197 |
| 1 | 1 | 32,000 | STRATOSPHERE | 51,097 | 0.77851 | 0.00005 | 0.77856 |
| 1 | 1 | 35,000 | STRATOPAUSE | 50,942 | 0.77615 | 0.00005 | 0.77620 |
| 1 | 1 | 47,000 | STRATOPAUSE | 50,718 | 0.65282 | 0.00183 | 0.65465 |
| 1 | 1 | 49,000 | STRATOPAUSE | 50,706 | 0.65266 | 0.00183 | 0.65450 |
| 1 | 1 | 51,000 | MESOSPHERE | 50,696 | 0.65254 | 0.00183 | 0.65437 |
| 1 | 1 | 54,000 | MESOSPHERE | 50,685 | 0.65240 | 0.00183 | 0.65423 |
| 1 | 1 | 71,000 | MESOSPHERE | 50,664 | 0.62227 | 0.00001 | 0.82228 |
| 1 | 1 | 75,000 | MESOSPHERE | 50,664 | 0.62226 | 0.00001 | 0.82227 |
| 1 | 1 | 84,852 | MESOPAUSE | 50,663 | 0.62224 | 0.00000 | 0.82224 |
| 1 | 1 | 90,000 | MESOPAUSE | 50,663 | 0.62224 | 0.00000 | 0.82224 |
| 1 | 1 | 100,000 | MESOPAUSE | 50,663 | 0.62224 | 0.00000 | 0.82224 |

SYNTHETIC APERTURE WAVEGUIDE FOR SOLAR ENERGY

| APERTURE ANGLE (DEGREES) | WALL THICKNESS (MICRONS) | OUTER RADIUS (METERS) | INNER RADIUS (METERS) | OUTER AREA (METERS²) | INNER AREA (METERS²) | OUTER VOLUME (METERS³) |
|---|---|---|---|---|---|---|
| 4 | 10 | 34.92076949 | 34.92075949 | 3831 | 3831 | 1277015.674 |
| 4 | 10 | 69.84153898 | 69.84152898 | 15324 | 15324 | 10216125.4 |
| 4 | 10 | 364.1284644 | 364.1284544 | 463557 | 5E+05 | 1699707863 |
| 4 | 10 | 523.8115424 | 523.8115324 | 861986 | 9E+05 | 4309927901 |
| 4 | 10 | 696.4153898 | 696.4153798 | 2E+06 | 2E+06 | 10216125395 |
| 4 | 10 | 907.9400058 | 907.9399968 | 3E+06 | 3E+06 | 22444827493 |
| 4 | 10 | 1117.464624 | 1117.464614 | 4E+06 | 4E+06 | 41845249618 |
| 4 | 10 | 1222.226932 | 1222.226922 | 5E+06 | 5E+06 | 54752047039 |
| 4 | 10 | 1641.276166 | 1641.276156 | 8E+06 | 8E+06 | 1.32584E+11 |
| 4 | 10 | 1711.117705 | 1711.117695 | 9E+06 | 9E+06 | 1.5024E+11 |
| 4 | 10 | 1780.959244 | 1780.959234 | 1E+07 | 1E+07 | 1.69397E+11 |
| 4 | 10 | 1885.721553 | 1885.721543 | 1E+07 | 1E+07 | 2.01084E+11 |
| 4 | 10 | 2479.374634 | 2479.374624 | 2E+07 | 2E+07 | 4.57058E+11 |
| 4 | 10 | 2619.057712 | 2619.057702 | 2E+07 | 2E+07 | 5.38741E+11 |
| 4 | 10 | 2963.097133 | 2963.097123 | 3E+07 | 3E+07 | 7.80158E+11 |
| 4 | 10 | 3142.869254 | 3142.869244 | 3E+07 | 3E+07 | 9.30944E+11 |
| 4 | 10 | 3492.076949 | 3492.076939 | 4E+07 | 4E+07 | 1.27702E+12 |

| INNER VOLUME (METERS³) | WALL VOLUME (METERS³) | OPTICAL POWER² (KWATTS) | COLLECTED POWER (KWATTS) AT VARIOUS EFFICIENCIES | | | OVERALL SYSTEM GAIN AT VARIOUS EFFICIENCIES | | |
|---|---|---|---|---|---|---|---|---|
| | | | 10% | 5% | 2% | 10% | 5% | 2% |
| 1277014.577 | 1.10 | 1.28 | 383.10 | 191.55 | 76.62 | 300.45 | 150.23 | 60.09 |
| 10216121 | 4.39 | 4.82 | 1532.42 | 766.21 | 306.48 | 317.61 | 158.80 | 63.52 |
| 1699707730 | 132.83 | 132.28 | 46355.67 | 23177.83 | 9271.13 | 350.18 | 175.09 | 70.04 |
| 4309927654 | 246.99 | 225.13 | 85196.55 | 43099.26 | 17239.71 | 382.88 | 191.44 | 76.58 |
| 10216124956 | 439.09 | 377.04 | 153241.88 | 76620.94 | 30548.36 | 406.43 | 203.22 | 81.29 |
| 22444826751 | 742.07 | 617.38 | 258978.77 | 129489.39 | 51795.75 | 419.48 | 209.74 | 83.90 |
| 41845248494 | 1124.08 | 875.16 | 392299.21 | 196149.60 | 78459.84 | 448.26 | 224.13 | 89.65 |
| 54752045694 | 1344.73 | 1043.78 | 469303.25 | 234651.63 | 93860.65 | 449.62 | 224.61 | 89.92 |
| 1.32584E+11 | 2424.90 | 1587.47 | 846276.28 | 423139.14 | 169255.66 | 533.10 | 266.55 | 106.62 |
| 1.5024E+11 | 2635.67 | 1725.03 | 919834.38 | 459917.19 | 183966.68 | 533.23 | 266.61 | 106.65 |
| 1.69397E+11 | 2855.21 | 1868.37 | 996455.32 | 498227.66 | 199291.06 | 533.33 | 266.65 | 106.67 |
| 2.01084E+11 | 3201.00 | 2094.21 | 1117133.30 | 558566.65 | 223426.66 | 533.44 | 266.72 | 106.69 |
| 4.57058E+11 | 5533.69 | 4550.25 | 1931230.79 | 965615.39 | 386246.16 | 424.42 | 212.21 | 84.86 |
| 5.38741E+11 | 6174.77 | 5077.30 | 2154963.93 | 1077481.97 | 430992.79 | 424.43 | 212.22 | 84.89 |
| 7.80158E+11 | 7903.55 | 6498.64 | 2758300.93 | 1379150.47 | 551660.19 | 424.44 | 212.22 | 84.89 |
| 9.30944E+11 | 8891.67 | 7311.09 | 3103148.07 | 1551574.03 | 620629.61 | 424.44 | 212.22 | 84.89 |
| 1.27702E+12 | 10977.37 | 9026.03 | 3631047.00 | 1915523.50 | 766209.40 | 424.44 | 212.22 | 84.89 |

LASER GENERATED SYNTHETIC MEGA SCALE APERTURE FOR SOLAR ENERGY CONCENTRATION AND HARNESSING

CROSS-REFERENCE TO RELATED APPLICATIONS

This application claims priority to U.S. Provisional Application Ser. No. 61/012,537, entitled LASER GENERATED SYNTHETIC MEGA SCALE APERTURE FOR SOLAR ENERGY CONCENTRATION AND HARNESSING, filed on Dec. 10, 2007, the entirety of which is incorporated herein.

BACKGROUND OF THE INVENTION

This invention relates to a method and apparatus for collecting solar energy.

While the innovation is particularly directed to the art of solar energy concentration and collection, and will be thus described with specific reference thereto, it will be appreciated that the innovation may have usefulness in other fields and applications.

By way of background, fundamental problems with solar energy is that the energy density is too low to be efficiently collected, and current methods for harnessing solar energy are in general 3-4 times more expensive than conventional methods for harnessing energy from fossil fuel energy sources. This in part is due to the low conversion efficiency (e.g., 7-8%) and to the high cost of silicon-based conventional photovoltaic panels. More recent technologies that use aerospace-type, high conversion efficiency (e.g., 30-40%) photovoltaic cells are extremely expensive and as such are currently not applicable to commercial applications on earth.

In order to improve the overall efficiency of the photovoltaic and thermal solar systems, several methods have been developed to concentrate solar energy. In addition, high intensity type photocells that are able to convert approximately 500-1000 suns of concentrated energy at a reasonably high efficiency (e.g., 20-35%) have been developed. Furthermore, concentrated solar energy results in high-quality heat, which is suitable for conversion into electric energy via a steam-type engine.

The cost of the concentrator-type photocells is much more expensive than conventional cells. However, the overall cost of the concentrator-type photovoltaic or thermal systems is lower than "one sun" panels. In any case, the costs associated with the various types of current solar energy harnessing systems is still considerably more expensive than conventional fossil fuels type systems.

The present invention contemplates new and improved systems and methods that resolve the above-referenced difficulties and others.

SUMMARY OF THE INVENTION

A method and apparatus are provided for generating a thin-walled plasma-like "hot shell" waveguide with an inverted cone shape for collecting and internally reflecting solar rays, which strike an interior wall of the waveguide at an angle greater than or equal to a critical angle, down an interior of the waveguide to the tip of the inverted cone for collection of concentrated solar energy.

In one aspect of the invention, a method of concentrating and collecting solar energy comprises determining a height and volume for a plasma sheet waveguide that collects solar energy, calculating an input laser power level to generate the waveguide, and providing a high-power laser pulse to heat a thin layer of atmosphere to a desired temperature to generate the waveguide. The method further comprises reducing the laser power level to maintain the waveguide at a desired temperature differential relative to surrounding atmosphere. The temperature differential between the heated thin layer of atmosphere and the surrounding atmosphere generates a refractive index differential that causes solar rays entering the waveguide to be internally reflected therein down to a base of the waveguide, where concentrated solar energy is collected.

In another aspect, a system that facilitates concentrating and collecting solar energy comprises a high-intensity laser that generates a plasma sheet waveguide of a predetermined height and volume, and one or more optical elements that direct laser light emitted from the high-intensity laser to form the plasma sheet waveguide. The system further includes a solar energy storage component, positioned at the base of the plasma sheet waveguide, that receives solar energy internally reflected within the plasma sheet waveguide. The high-intensity laser emits laser light at a first output power level that heats a thin layer of atmosphere to a predetermined temperature to generate the plasma sheet waveguide, and emits the laser at a second output power level to maintain the plasma sheet waveguide at a predetermined temperature differential relative to surrounding atmosphere.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIGS. 13A, 13B and 13C collectively illustrate a table including exemplary values associated with hot shell performance. An example of laser power requirement calculation is presented below.

DETAILED DESCRIPTION

Figure 1:
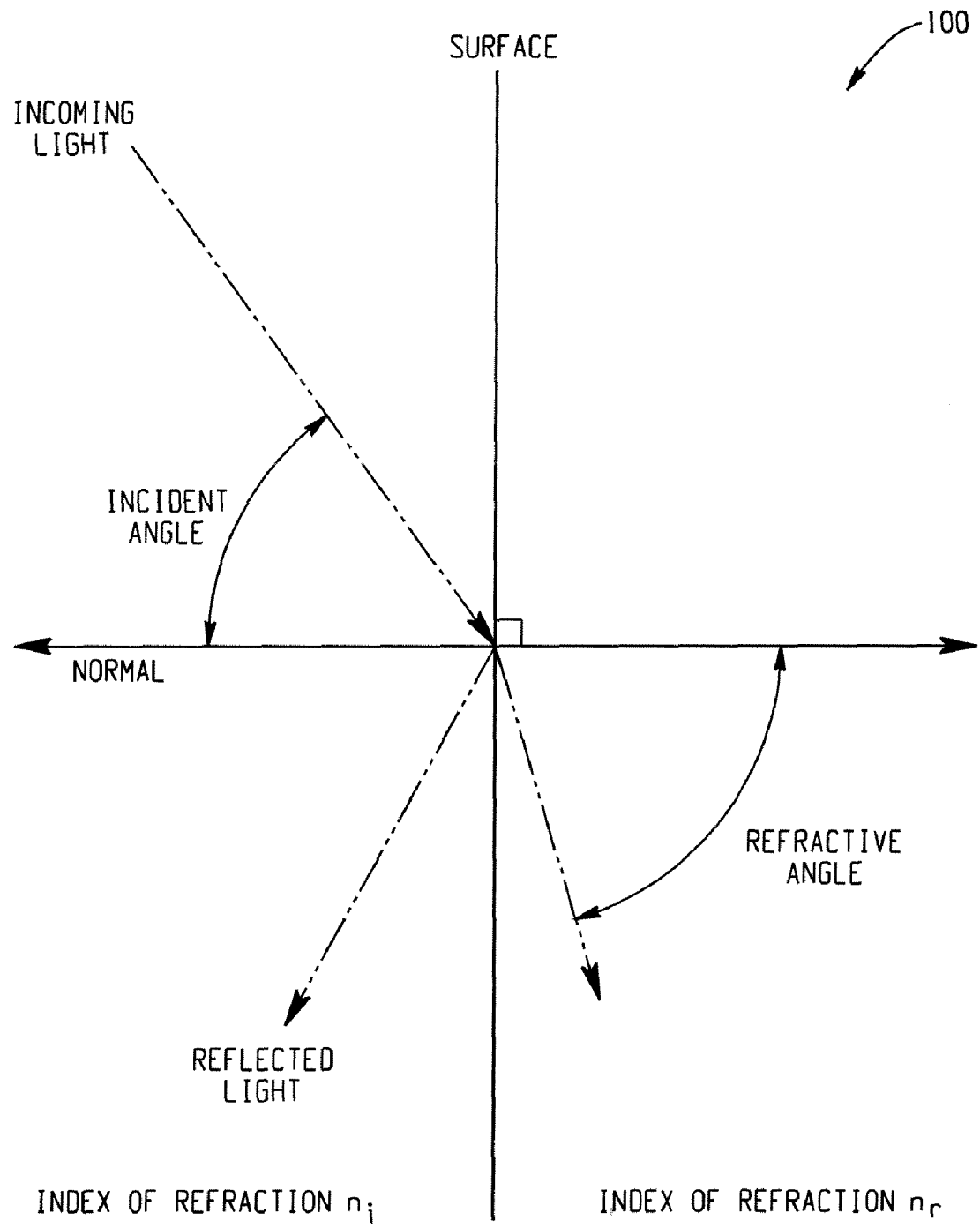
FIG. 1 illustrates a ray of incoming, or incident, light that travels through a first medium (e.g., atmosphere or air) having a first index of refraction $n_i$, and strikes a surface of a second medium (shaded; e.g., plasma boundary) having a second index of refraction $n_r$, at an incident angle.

Referring now to the drawings wherein the showings are for purposes of illustrating the exemplary embodiments only and not for purposes of limiting the claimed subject matter, FIG. 1 provides an overview 100 of a typical light behavior between two media, which feature is exploited by the presently described embodiments. As shown generally, FIG. 1 illustrates a ray of incoming, or incident, light that travels through a first medium (e.g., atmosphere or air) having a first index of refraction $n_i$, and strikes a surface of a second medium (shaded; e.g., plasma boundary) having a second index of refraction $n_r$, at an incident angle. If the incident angle is greater than a critical angle, relative to normal (e.g., a line intersecting the surface at 90°), then the incident light ray will be reflected off of the surface. If the incident angle is less than the critical angle, then the light will be refracted through the second medium. When the incident angle is equal to the critical angle, half of the incident light ray will be refracted and half will be reflected. That is, the incident light ray will refract through the second medium half of the time and will reflect off of the second medium half of the time, when the angle of incidence is equal to the critical angle.

The synthetic aperture (waveguide) is able to bend (reflect) the direction of the incoming light from its original path into a desired direction. The proposed light bending technique is similar to that of an optical mirage, which is a naturally occurring phenomenon of light bending. The mirage is caused by abnormal atmospheric conditions that cause a change in the air density leading to a change in the refractive index (n). This deviation causes the light to bend, giving the illusion of the mirage. The objective of the synthetic aperture is to quantify the conditions which create a mirage and to develop the means to control them.

Developing the synthetic aperture includes altering the refractive index for a specific geometric volume of the atmosphere. The optical refractive index is dependent on the atmospheric pressure, temperature and composition. Modification of the index of refraction is made by heating the air, as realized through generating a plasma field with an ultra-high intensity laser. When light rays passing through the atmosphere come in contact with the boundary of the established plasma, the rays can either reflect, refract or pass straight through the boundary depending upon the incident angle, as depicted in FIG. 1. For this application, a desired result is a reflection off the boundary by maintaining the minimum critical angle.

Figure 2A:
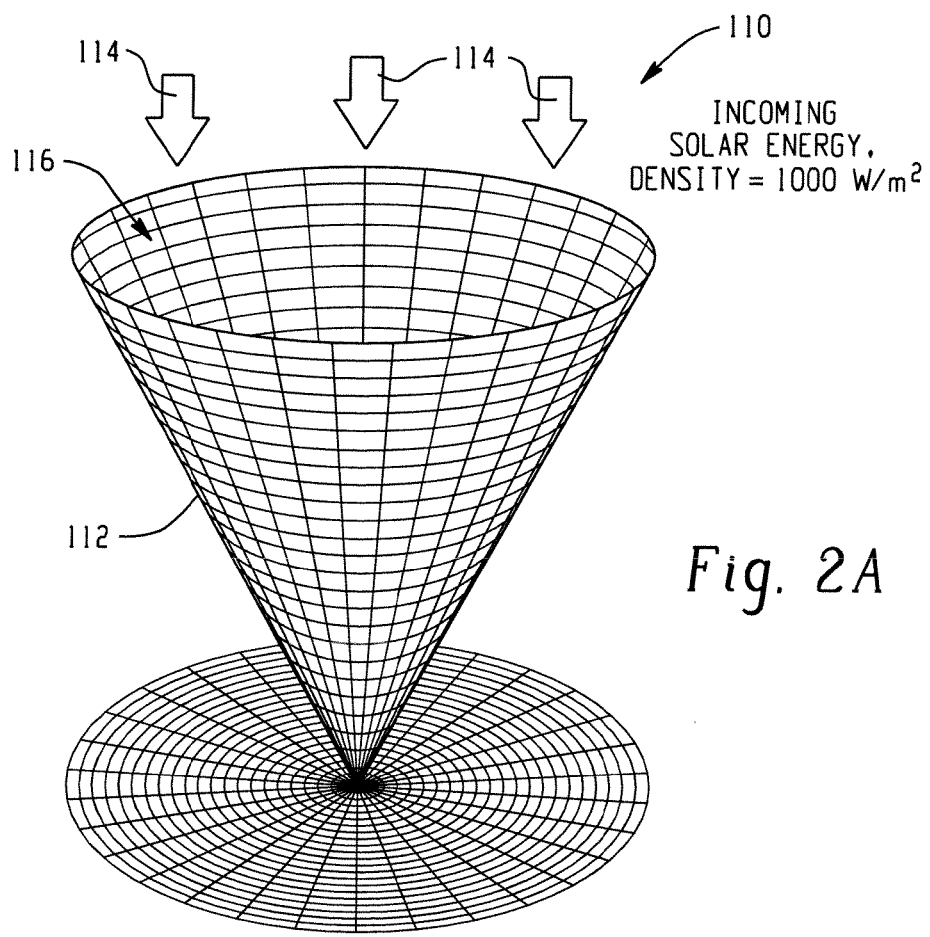
FIG. 2A illustrates a system for concentrating and harnessing vast amounts of solar energy via a laser-generated synthetic aperture concentration (LGSAC) system.

FIG. 2A illustrates a system 110 for concentrating and harnessing vast amounts of solar energy via a laser-generated synthetic aperture concentration (LGSAC) system. The system employs the ability of high-intensity lasers (not shown) to set up a thin plasma sheet 112, also called a waveguide or "hot shell" herein, in the atmosphere as a function of beam intensity and geometry. A laser beam can be spread and directed with physical optics (e.g., lenses, mirrors, or other optical elements capable of reflecting, refracting, and/or redirection the laser, etc.) to generate a thin (e.g., on a micrometer or nanometer scale) cone-shaped hot shell waveguide in the atmosphere. The hot shell of the waveguide has a different index of refraction (n) from that of the surrounding air layers and as such serves to internally reflect (redirect) portions of the entering sun rays 114, which enter an aperture 116 in the hot shell 112, toward the base of the cone, thus providing a virtual solar energy concentration system.

The underlying physical principle of the process is similar to that of an optical mirage on the road or in the desert on a hot day. In a mirage, a hot thin layer of air near the ground forms with relatively cooler air layers above it. The difference in the temperature of the layers, and thus the difference in the index of refraction of light (n), serves to reflect and to refract portions of the light rays (solar energy) that fall on it. Under certain conditions, the light falling on the hot layer at an angle near or larger than the critical angle will be totally reflected and thus forms a mirage. As mentioned above and understood by those of skill in the art, the term "critical angle" relates to an angle at which light incident upon a medium will either enter the medium or be reflected thereby 50% of the time, respectively. Light incident upon the medium at an angle greater than (relative to a hypothetical orthogonal line intersecting the surface of the medium at 90°) the critical angle is reflected, and light incident upon the medium at an angle less than the critical angle is refracted into the medium. For instance, if a medium has a critical angle of 45°, then light incident on the medium at 60 from vertical (e.g., 30° relative to the surface of the medium) will be reflected, while light incident on the medium at 40° from vertical (e.g., 50° relative to the medium surface) will be refracted by the medium.

The mirage phenomenon is exploited to form the synthetic aperture concentration (SAC) system. Pulsed or continuous high-energy lasers are used to heat a micro-thin layer of air in order to generate a difference in the index of refraction. The laser beam shape, intensity and direction can then be manipulated to form the solar concentration cone.

The concentration power of such a system is a function of several factors, including atmospheric conditions, hot shell thickness, cone half angle, laser frequency and intensity, the absorption characteristics of the atmosphere at the specific laser frequency that is being used, etc. The combination of these parameters determines the gain of the system, which is represented as the amount of the harnessed optical energy divided by the amount of the optical laser energy that is required to operate the system.

In one embodiment, the effective height of the waveguide cone may reach a hundred kilometers, depending on the frequency and energy of the laser. This in part is due to the fact that although the laser energy is progressively absorbed by the atmosphere, the effective intensity of the beam extends a great distance, since it is only illuminating a very thin layer on the surface of the cone rather than throughout its volume. Although the proposed cone half angle is, in one example, on the order of approximately 2°, the cone opening (aperture) at such heights expands geometrically with altitude, and thus will have an opening area on the order of approximately 1.5 $Km^2$ at an altitude of 20 Km and may reach as large as 40 $Km^2$ at an altitude of 100 Km depending on the operating conditions and the power of the laser. It will be appreciated that any desired cone half angle may be employed in accordance with the various embodiments and aspects described herein. The aperture opening allows large amounts of solar energy (e.g., on the order of gigawatts and terawatts) to enter the waveguide cone before concentration, considering that the sun intensity is approximately 1 $KW/m^2$ at these altitudes.

The system is highly scalable and has a "gain" that is much larger than unity. The gain increases geometrically with increases in the laser beam intensity. In one embodiment, gigawatts of solar energy can be gathered at a system gain of over 250 by using a 100 K Watt laser and assuming that only 5% of all the solar energy entering the cone aperture is actually collected.

The system may be deployed in fixed power plant type installations or aboard electric aircrafts, airships and other types of moving platforms because of its potentially low mass-to-energy harnessing ability. Alternatively, the system may be used to reject large amounts of solar energy back into space. This can be accomplished by manipulating the laser field in order to increase the angle of the cone of the waveguide which can ultimately result in a hot micro sheet that reflects some of the incident solar energy back into space.

Thus, the system represents a new type of solar concentrator that can increase the magnification of the solar energy over ten thousand times, while not requiring a large physical structure typically associated with traditional optics. The concentrator comprises the laser-generated plasma field, which generates a virtual waveguide, with no mechanical structure, to focus the incoming solar energy to a small collection point. This enables a more efficient and economical system for converting solar energy into electrical energy.

Technologies that facilitate the creation of the synthetic aperture include recent advancements in ultra-high intensity pulsed lasers and their transmission optics. They provide the ability to generate a plasma field, and to have precise control over the field's geometry, which in turn facilitates operation of the synthetic aperture.

Figure 2B:
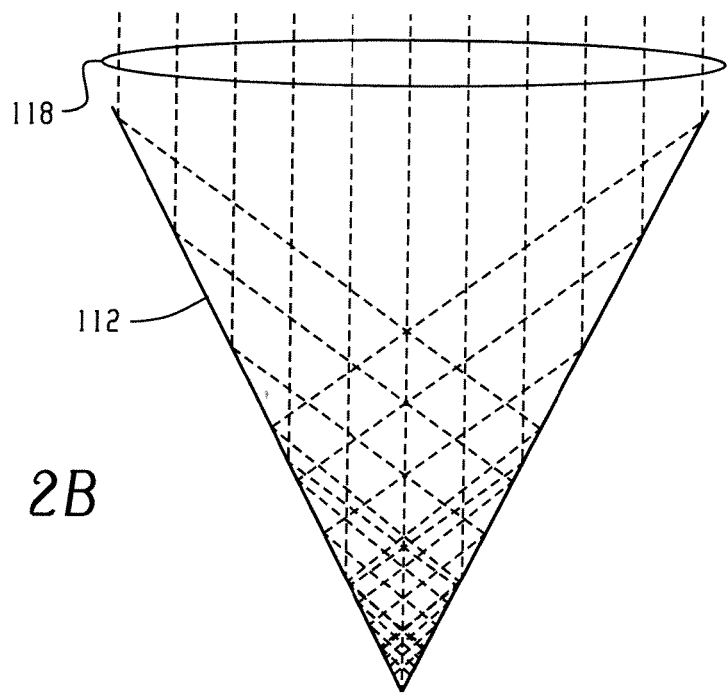
FIG. 2B illustrates another embodiment of the laser-generated aperture, showing a cross-sectional view of internal reflections in a 2° plasma cone.

FIG. 2B illustrates another embodiment of the laser-generated aperture, showing a cross-sectional view of internal reflections in a 2° plasma cone. By manipulating a laser beam (not shown) with either a series of optics or by quickly retracing the beam, an inverted cone shape can be produced. As illustrated, the outer walls of the hot shell 112 cone are defined by the plasma field, and the interior volume of the cone is the remaining atmosphere. The mouth of the cone is the aperture, where light rays 118 can enter. When the cone is pointed at the sun and adjusted to maintain the critical angle between the parallel rays of light and the normal to the walls of the cone, all of the incoming light traverses downward through a series of reflections. The aperture then acts like a funnel due to the total internal reflection of the energy.

The amount of incoming light to be concentrated at the bottom of the hot shell cone is defined by the maximum diameter of the cone. As an example, if the aperture is opened up to a diameter of approximately 2 kilometers, the area of the aperture is approximately 3 million $m^2$. At a typical solar intensity of 1000 $W/m^2$, the total amount of solar energy entering the aperture would be equal to 3 TW. Even if the aperture were only operating at an efficiency of 1%, the amount of energy collected at the focal point would be an impressive 30 MW. Moreover, the remaining 99% of the energy would be redirected in the near vicinity of the focal point.

As is known in the art, plasma channels can be generated by femtosecond laser pulses for the purpose of redirecting lightning. There have also been studies in using an ultraviolet laser created plasma filament to serve as a reflection or absorption medium, as well as a waveguide for microwaves. One important development in laser technology is the ongoing refinement of the pulsed laser. Compared with the older continuous power lasers, the pulsed lasers offer a large increase in power density by periodically bursting their output in femtosecond pulses. The pulsing action allows for a better power to weight ratio, and decreases the overall size of the laser hardware. Solid-state pulsed lasers eliminate the logistical issues associated with the hazardous chemicals used to fuel conventional gas lasers. Driven by various weapons applications, ultra-high power pulsed or continuous lasers are now available in the Megawatt class, such as the Airborne Laser (ABL) built by Northrop Grumman.

When generating the hot shell 112, each pulse of the laser bombards the atmosphere with a measured amount of photonic energy. When this energy is increased to a certain level, electrons in the atmosphere become disassociated from their atoms, creating an ionized plasma state. Between laser pulses, the electrons begin to return back to their atoms. The integrity of the field is maintained as long as the pulsing frequency of the laser is faster than the relaxation rate of the ionized plasma. Due to the Kerr-lens effect, once the refractive index has been modified, the plasma field has a self focusing effect on the laser beam. This effect reduces the amount of laser power required to maintain the plasma field.

When generating the plasma field in the Earth's atmosphere, careful consideration is given to proper wavelength selection. The atmosphere is most susceptible to ionization (e.g., greater absorbance) by the shortest wavelengths of the light spectrum, as described by Beer-Lambert's Law. For this reason, a laser in the UV region (100-400 nm) may be desirable for the establishment of the plasma field. UV lasers are available for the purpose of micro-via drilling applications, as is known. Due to a growing industrial market, the power ratings of UV lasers are currently on the rise. Studies have also been made as to the feasibility in using a sub-picosecond UV laser pulse in order to generate a long plasma filament in the atmosphere. This research is aimed at creating a conductive path in the atmosphere to transmit electrical energy.

Spurred by the recent developments in weapons-grade ultra-high power pulsed lasers, beam conditioning and control optics have also been developed. Information regarding the manipulation and transmission of high powered lasers is generally classified due to the nature of their application. It is well known however, that successful high power laser systems are currently operational, and it follows that the conditioning and control optics are in place to handle such a system. For many of the laser weapons systems, a secondary laser is used to test the integrity of the primary beam between pulses. Many of these systems also rely on optical recognition to track their targets. According to an embodiment described herein, this technology is adapted to generate the hot shell 112.

Figure 3:
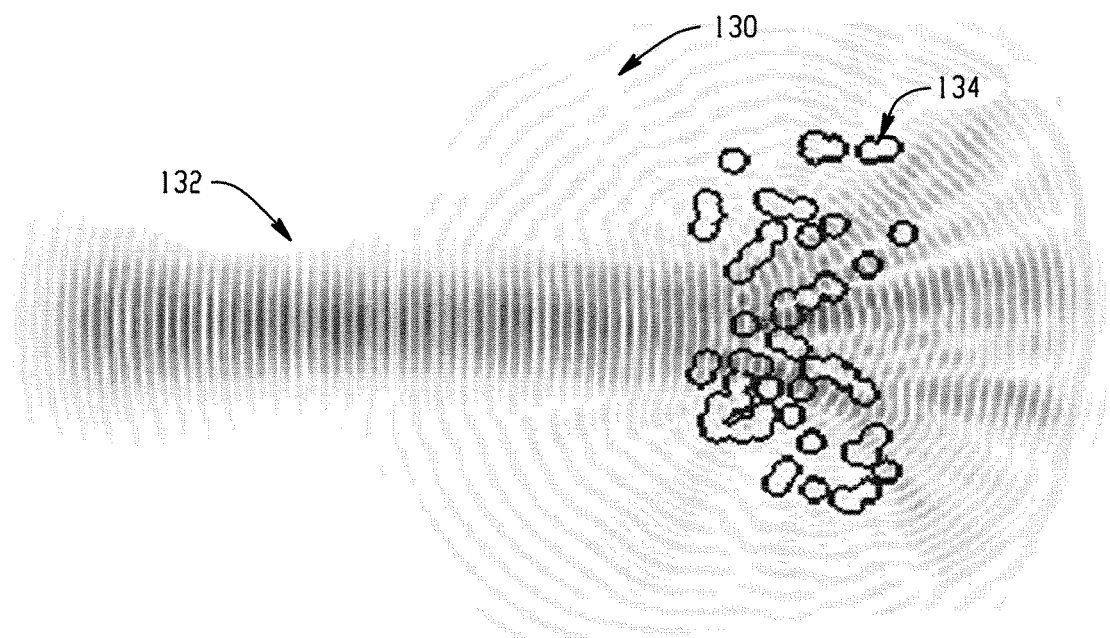
FIG. 3 illustrates a representation of Mie scattering, scintillation and absorption of a collimated beam of light, in accordance with various aspects described herein.

FIG. 3 illustrates a representation 130 of Mie scattering, scintillation and absorption of a collimated beam of light, in accordance with various aspects described herein. The condition of the atmospheric medium is evaluated to ensure proper operation of the synthetic aperture. Various circumstances have an influence on the nature of the optical propagation. For instance, moisture in the form of rain droplets can cause a minimal amount of Raleigh and Mie scattering, as well as absorption of the laser energy as shown in FIG. 3. Fog can have a much larger attenuation effect, since the aerosol particles are closer in size to the wavelength of the laser. For instance, a dense fog can cause an increase in the scattering and absorption of the laser energy. Scintillation can also result from the small-scale fluctuations in the index of refraction of the atmosphere, as depicted by the energy fluctuations at the right edge of FIG. 3. This causes small variations in the temperature of the atmosphere, leading to inconsistencies within the plasma field. As the result, the system can function predictably during rainstorms, and can change its operating characteristics during periods of heavy fog.

Larger airborne solids, such as particles of sand, can have a dramatic attenuation effect on the laser energy. To a lesser degree, atmospheric turbulence can also disrupt the integrity of the aperture. In strong winds, the intensity of the laser beam can be increased accordingly to compensate for the displaced heated molecules.

Since a high altitude is useful for operating the system, and intense energy is involved in both the creation and collection of the aperture, the system can be integrated into an existing global air-traffic control structure such as a restricted airspace. Extra radar tracking may be installed near the apertures to scan for aircrafts in the near vicinity and warn them of a potential hazard. The synthetic aperture may be temporarily disabled as a safety precaution in the event of a breach of airspace.

A significant secondary phenomenon occurs as the result of the synthetic aperture's presence. Since the solar energy is being redirected and focused to a point destination, some regions of the surrounding atmosphere and terrain underneath the perimeter of the cone may receive a reduced amount of solar energy, which can cause a temperature drop in those surrounding areas. In urban environments, this may be used constructively to counteract the heating of the atmosphere due to concrete reflections. In desert regions, this phenomenon may be used to transform the climate immediately adjacent to the aperture into one more desirable for human habitation or wildlife.

Figure 4:
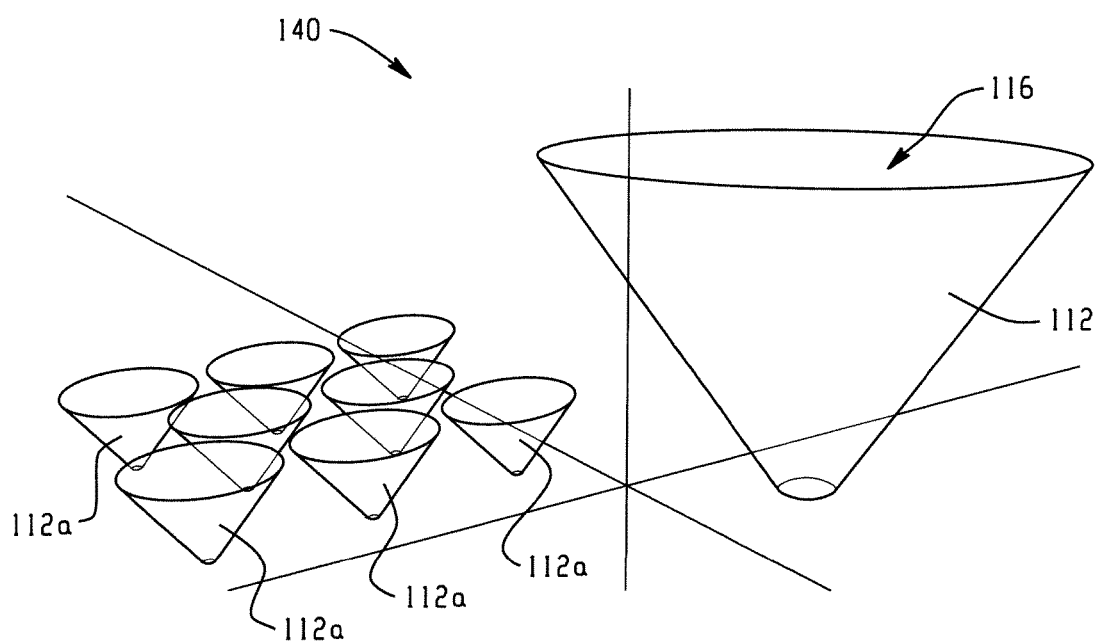
FIG. 4 illustrates an application for the LGSAC system as a large or small scale replacement for a conventional solar energy harnessing facility.

FIG. 4 illustrates an application 140 for the LGSAC system as a large scale replacement for a conventional solar energy harnessing facility. As solar energy descends through the aperture 116, the energy density quickly multiplies. At the base of the hot shell 112, a concentrated amount of energy can be collected and converted. A centralized application of the synthetic aperture may stretch thousands of meters into the sky, but the system may also be scaled down, as illustrated by the plurality of hot shells 112a. Distributed applications, such as power generation in a remote area, need only to be as large as the local power requirements. In order to reduce the high altitude required to harness massive amounts of energy, a cluster of smaller scale hot shell installations may be placed in close proximity to each other. Due to the higher atmospheric pressures at lower altitudes, a cluster of smaller apertures may also be more effective than one large aperture of the same volume, in addition to reducing the individual power requirement for the laser(s).

Figure 5:
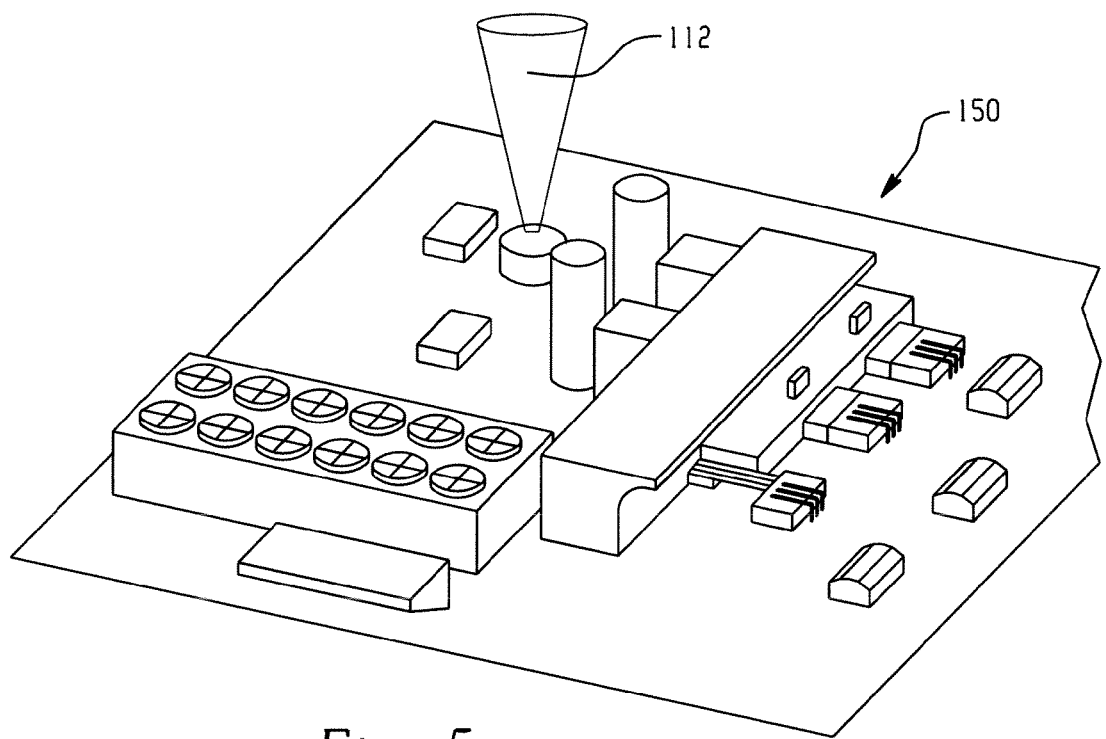
FIG. 5 illustrates the hot shell deployed at a power plant 150, in accordance with various aspects described herein.

FIG. 5 illustrates the hot shell 112 deployed at a power plant 150, in accordance with various aspects described herein.

Figure 6:
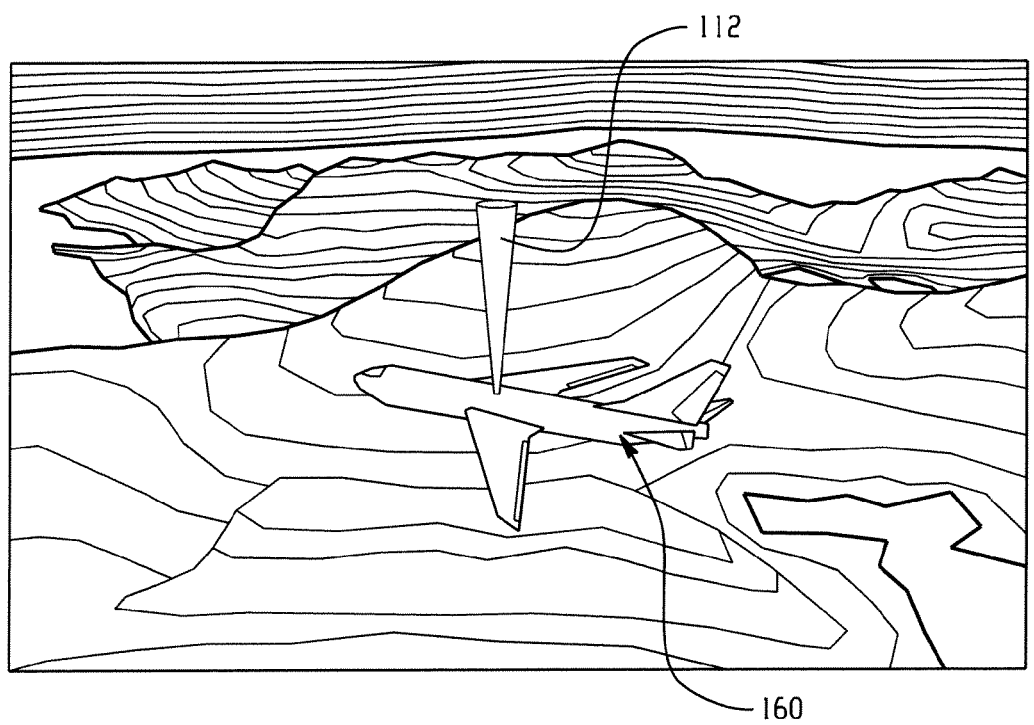
FIGS. 6 and 7 illustrate the hot shell deployed aboard moving platforms such as aircrafts and airships to serve as primary or supplementary source of power for all electric or hybrid aircrafts and airships.
Figure 7:
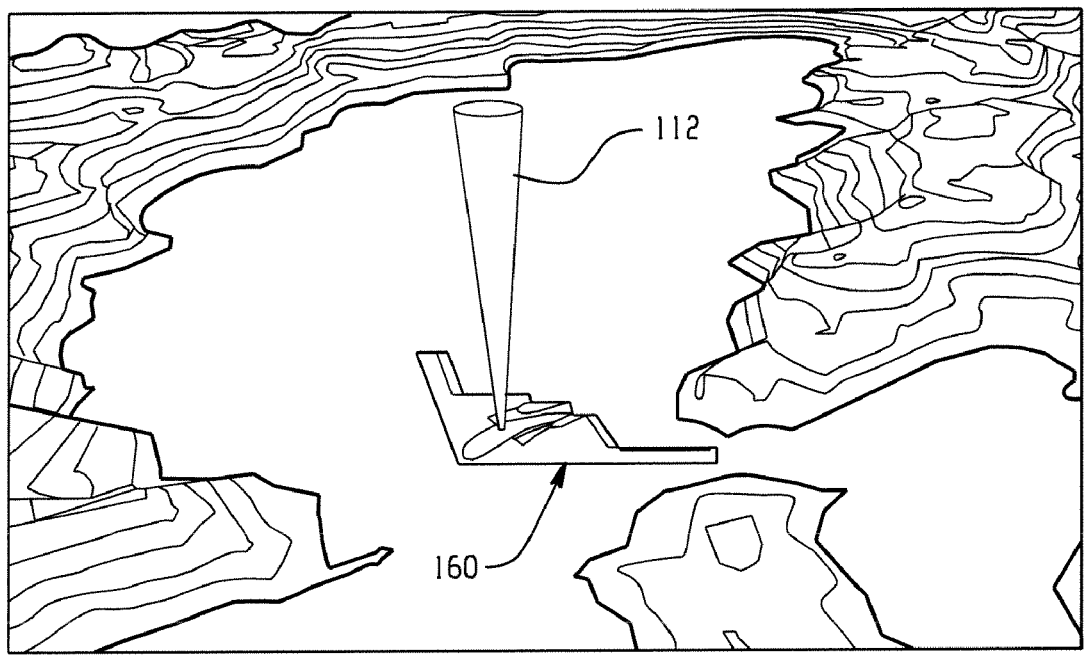

FIGS. 6 and 7 illustrate the hot shell 112 deployed aboard moving platforms such as aircrafts 160 and airships to serve as primary or supplementary source of power for all electric or hybrid aircrafts and airships. The large amounts of concentrated solar energy that can be harnessed in few hours of daylight can serve to reduce the fuel consumption of commercial aircrafts and high altitude airships. The system may also be coupled with high efficiency battery storage mediums or other types of energy storage and conversion systems to enable continuous 24/7 operations of manned and or unmanned aircrafts and airships.

Figure 8:
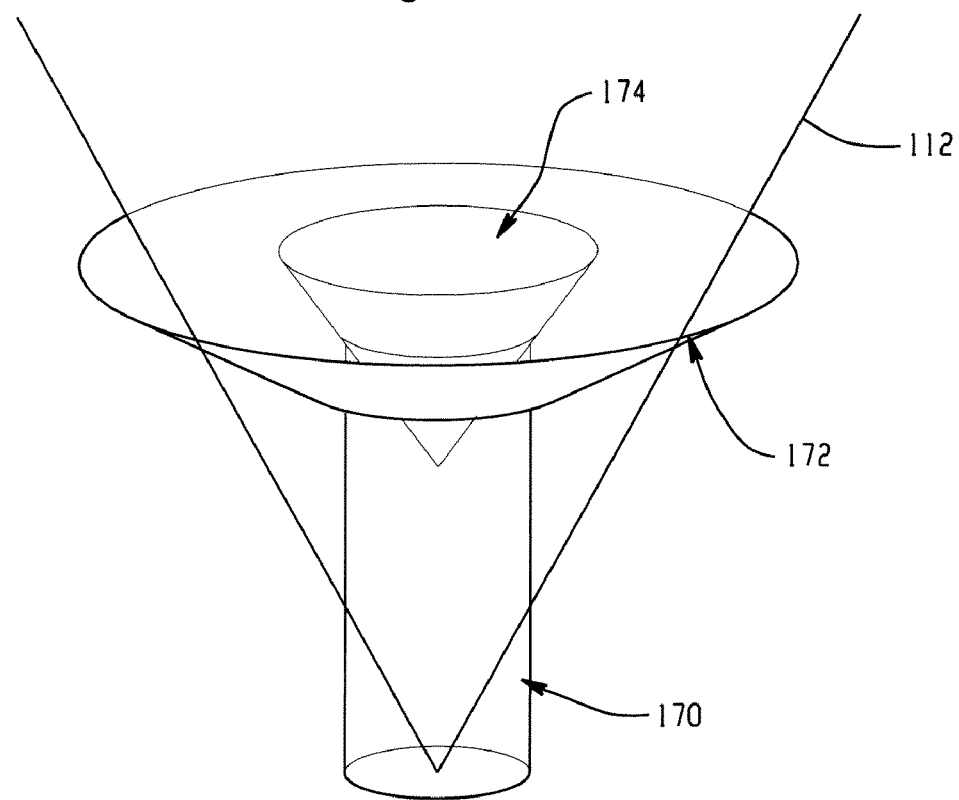
FIG. 8 illustrates another embodiment in which the hot shell is generated from a cylindrical laser beam transformed into a thin walled conical form using optical elements to generate the cone shaped synthetic aperture, although other schemes may also be used to generate the conical shape synthetic aperture.

FIG. 8 illustrates another embodiment in which the hot shell 112 is generated from a cylindrical laser beam 170 transformed into a thin walled conical form using optical elements 172, 174 to generate the cone shaped synthetic aperture.

Establishing the synthetic aperture waveguide is a dynamic process that employs a high intensity laser pulse to initially establish the hot shell and a much-reduced-intensity beam to sustain it. The high intensity pulse results in the generation of an extremely long filament in the atmosphere on the order of several kilometers. The filament continues to grow in length proportionally with the length of time the high intensity pulse stays on, because more energy is progressively available to heat the upper portions of the atmosphere with time since the laser energy is absorbed at much lower rates by the now-superheated lower regions of the laser path. This process duration can be on the order of a fraction of a second. Once the full length filament (plasma sheet, or hot shell) is established, a much lower laser beam intensity can be employed to sustain it. The magnitude of the beam intensity may depend on the atmospheric conditions such as wind speed in addition to other factors.

A difference in the index of refraction "n" between the wall (shell) of the waveguide cone and the surrounding atmosphere causes the light rays that enter the aperture and strike the wall at an angle greater than the critical angle to be totally internally reflected. The rays continue to go through multiple reflections inside the conical shape waveguide until they reach the energy collection system at the bottom. In one example, a sufficient difference in the index of refraction can be generated by heating the wall of the conical waveguide by a minimum of approximately 1° C. above the surrounding atmosphere.

The amount of energy employed to raise the temperature of a cubic meter of air at standard temperature and pressure of 20° C. and one atmosphere is 1200 Joules/$m^3$ of air at sea level as indicated in the sample calculations described below with regard to FIGS. 13A, 13B and 13C. Considering that the height of the waveguide can reach tens-to-hundreds of kilometers, it is clear that the laser light can propagate through several layers of the atmosphere. Air density, moisture content and the ambient temperature become progressively lower as a function of altitude with the density reaching approximately zero at altitudes above about 100 kilometers.

Figure 9:
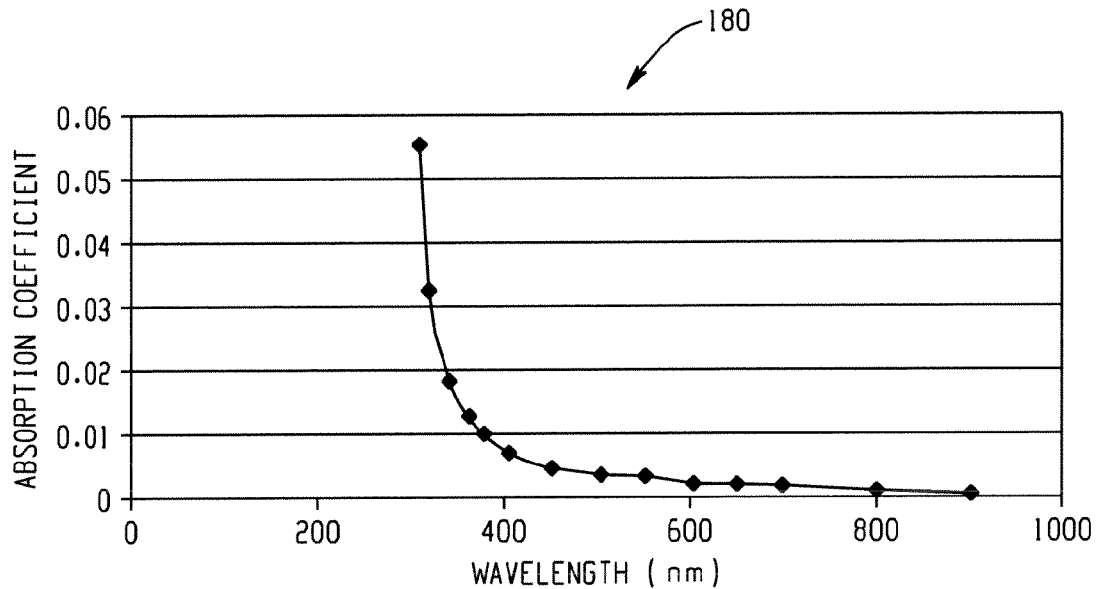
FIG. 9 is a graphical representation of an example of the absorption coefficient of air at sea level versus laser frequency.

FIG. 9 shows a graphical representation 180 of the absorption rate of the laser energy in the atmosphere as a function of the wavelength. FIG. 9 illustrates the Beer-Lambert law, which shows the absorption coefficients as a function of the wavelength of light by the atmosphere. The short wavelengths, as in the case of UV light, are absorbed at a much higher rate than the warm sun light in the near and far infrared regions of the spectrum.

The laser beam intensity becomes progressively lower the further the beam propagates because of the absorption rate. This is termed the beam extinction rate. The beam extinction rate and thus the practical laser light intensity that reaches a specific altitude is a function of the laser wavelength in addition to the atmospheric conditions. Therefore, the higher the original intensity of the original laser beam, the higher the altitude that it will reach with sufficient intensity in order to generate the 1° C. differential in the wall thickness per unit of time (e.g., approximately one second). The longer the laser beam stays on, the higher the temperature differential achieved. The temperature differential may be attenuated as a function of wind speed and other factors that serve to move cooler air into and out of the wall of the waveguide, which may periodically need to be reheated.

In one embodiment, a minimum of a 1° C. differential at the maximum height of waveguide in the 10 micrometer thickness of the waveguide's wall is generated. However, the temperature differential increases inversely with the altitude and continues to increase with time even at maximum altitudes. Hundreds to thousands of ° C. differentials near the base of the waveguide can be generated and can result in a plasma wall at the lower altitudes in a very short amount of time (in sub-seconds). This causes much higher differentials in the index of refraction "n" toward the bottom of the waveguide and thus higher concentration efficiency because of the resulting decrease in the critical angle that is required for total internal reflection of solar energy.

Figure 10:
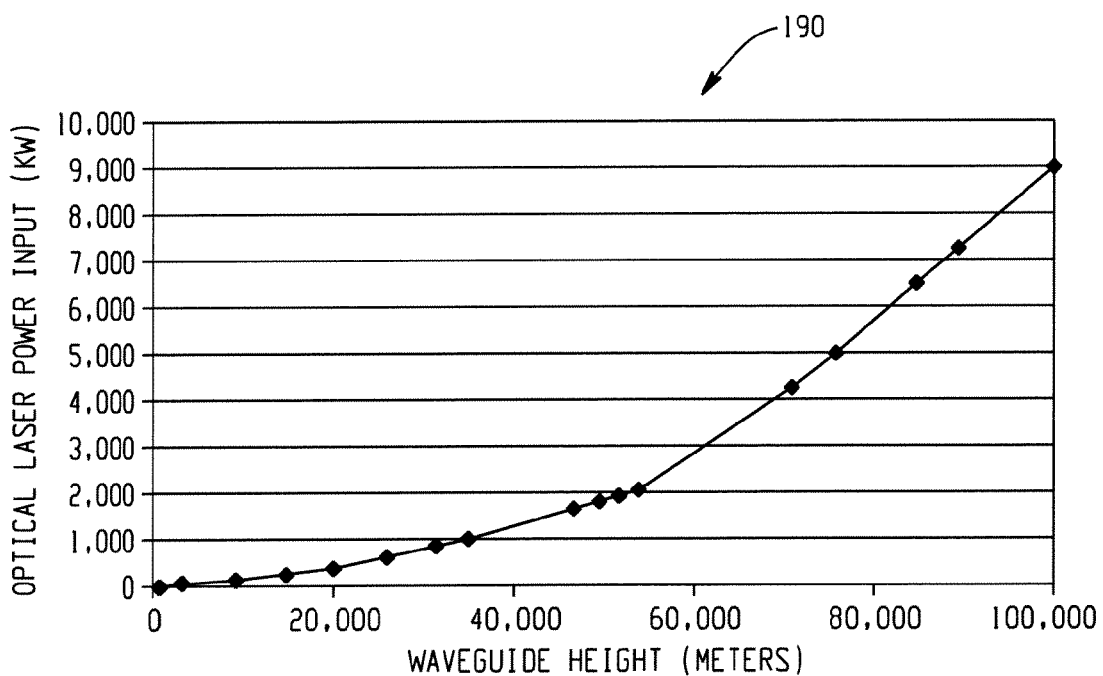
FIG. 10 is a graphical representation of an example of hot shell height versus input laser power.

FIG. 10 is a graphical representation 190 of an example of hot shell height versus input laser power.

Figure 11:
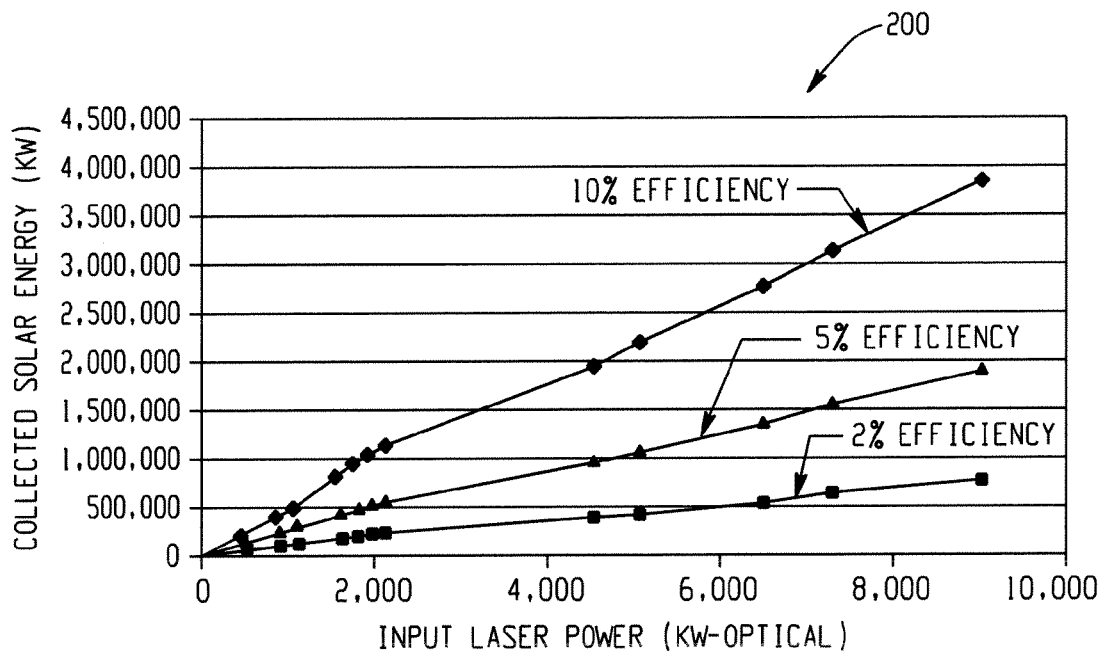
FIG. 11 is a graphical representation of an example of solar energy collection (at 5% efficiency) versus input laser power.

FIG. 11 is a graphical representation 200 of an example of solar energy collection (at 2%, 5%, and 10% efficiency) versus input laser power.

Figure 12:
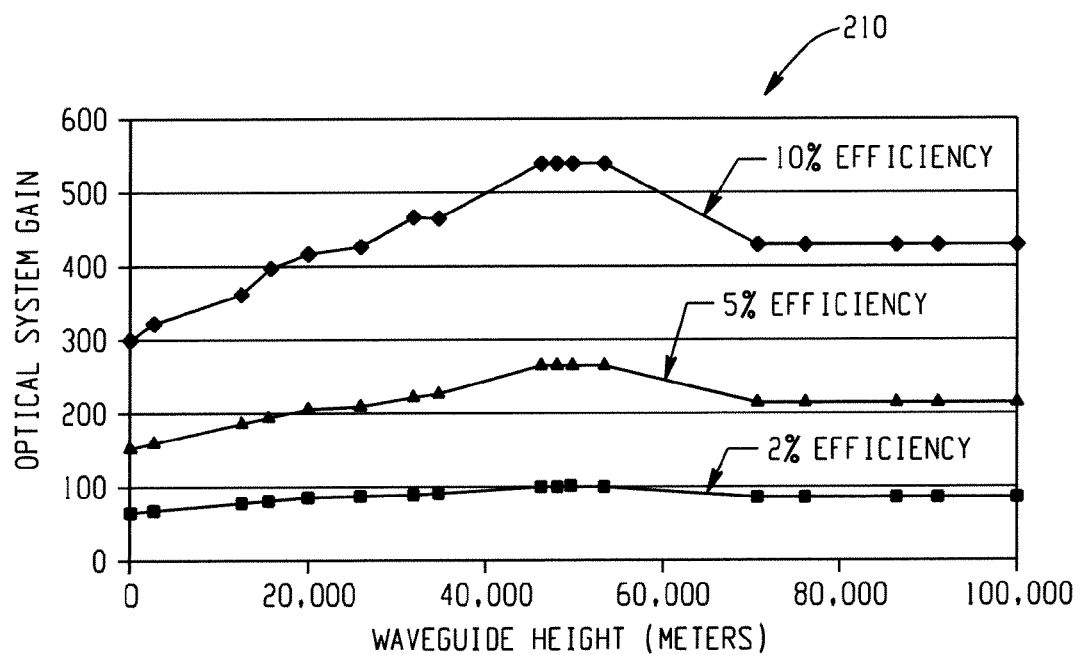
FIG. 12 is a graphical representation of an example of optical power system gain versus hot shell height.

FIG. 12 is a graphical representation 210 of an example of optical power system gain versus hot shell height (at 2%, 5%, and 10% efficiency).

FIGS. 13A, 13B and 13C collectively illustrate a table 220 including exemplary values associated with hot shell performance. Relative humidity is evaluated at 45%, and optical power employed to generate a waveguide is shown in kilowatts. An example of laser power requirement calculation is presented below.

In this example, a sufficient difference in the index of refraction can be generated by heating the wall of the conical waveguide hot shell by a approximately 1° C. above the surrounding atmosphere. The amount of energy employed to raise the temperature of a cubic meter of air at standard temperature and pressure of 20° C. and one atmosphere is 1200 Joules/m³ of air at sea level as indicated in the sample below:

density of dry air molecules:

$$D = P_d/(R_d \times T)$$

where: D=density, kg/m³
$P_d$=base atmospheric pressure, Pa
$R_d$=gas constant for dry air=287.05 J/(kg*° K)
T=base temperature, ° K
at 0 m (sea level): $P_d$=101325 Pascals & T=288.15 K
dry air density=1.2 kg/m^3 (at 20 C)
at 11,000 m: $P_d$=22632.1 Pascals & T=216.65 K
dry air density=1.75 kg/m^3
at 71,000 m: $P_d$=3.95642 Pascals & T=214.65 K
dry air density=0.000064 kg/m^3
at room temperature: 22 C=295 K $$\Delta 1° C. = \Delta 1° K$$

for a 1K increase in air (from 20° C. to 21° C.):
defining equation for specific heat:

$$dUth = m*c*dT \text{ (for dT sufficiently small)}$$

where: Uth=thermal energy (J)
m=mass (kg)
c=specific heat of air=1000 J/kg*K (at sea level)
dT=temperature rise (K)

$$dUth = 1.2 \text{ kg} * 1000 \text{ J/kg} * K * 1K$$
$$= 1200 \text{ J of thermal energy to raise } 1 \text{ m}^3 \text{ of air by } 1° C.$$
(at sea level)

Power/energy conversion: 1 W=1 J/s
Optical laser power(watts)=wavelength_absorbance*ΔT*1200 J/m³*time(s)*volume(m³)

Figure 14:
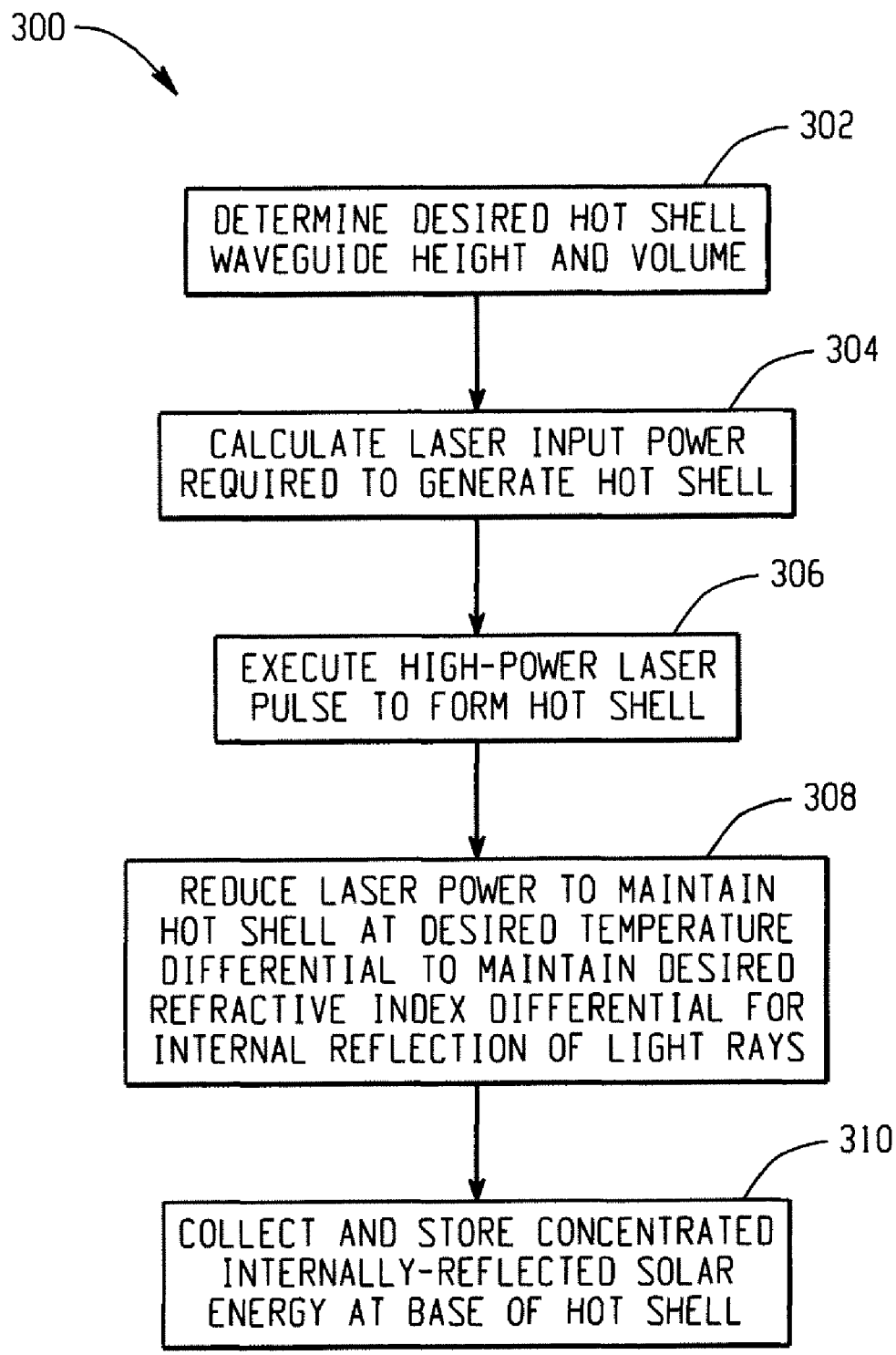
FIG. 14 illustrates a method for generating a thin-walled hot shell waveguide for solar energy collection and concentration, in accordance with various aspects described herein.

FIG. 14 illustrates a method 300 for generating a thin-walled hot shell waveguide for solar energy collection and concentration, in accordance with various aspects described herein. At 302, hot shell height and volume are determined. At 304, input laser power required to generate the determined hot shell waveguide is calculated. At 306, in initial high-power laser burst is generated to heat air in a predefined inverted conical shape. At 308, laser power is reduced to maintain the hot shell at a predetermined temperature differential relative to surrounding air, in order to maintain a sufficient refractive index differential to cause light entering the top of the inverted cone-shaped waveguide to reflect internally down to the base of the inverted cone. At 310, concentrated solar energy is collected and stored.

It will be appreciated that the laser employed in method 300 may be, for instance, a UV laser (e.g., 100-400 nm wavelength), a UV sub-picosecond pulse laser, or the like. Additionally, the conically-shaped waveguide may have the shape an approximately 2° inverted cone or the like. In one example, the temperature differential maintained between the hot shell and the surrounding air is at least approximately 1° C.

Figure 15:
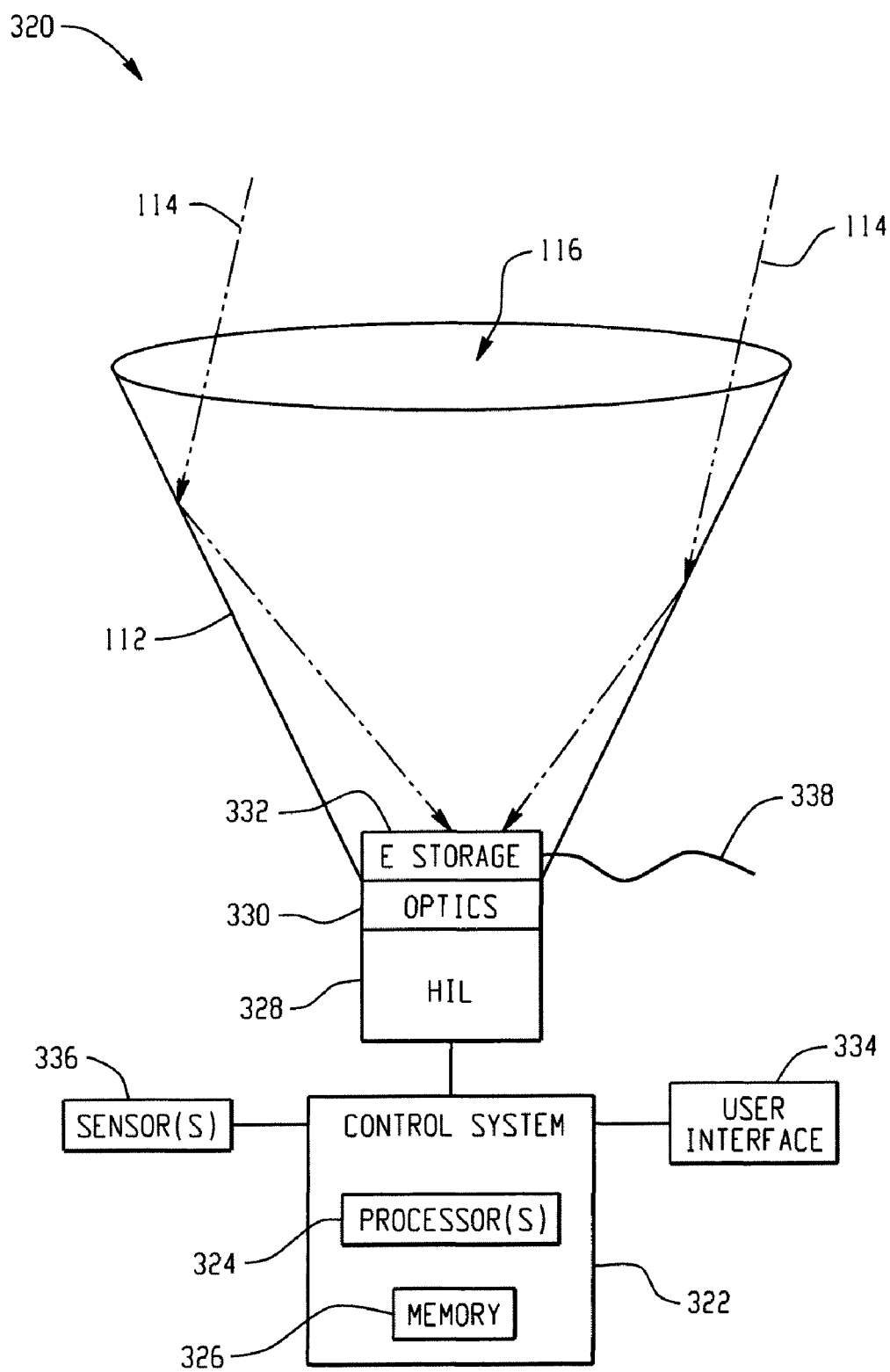
FIG. 15 illustrates a system that facilitates concentrating and collecting solar energy, in accordance with various aspects described herein.

FIG. 15 illustrates a system 320 that facilitates concentrating and collecting solar energy, in accordance with various aspects described herein. The system 320 includes a control system 322 with one or more processors or computers 324 and memory 326 for processing and/or storing information related to laser control and/or plasma sheet waveguide 112 generation and maintenance. The control system is coupled to a high-intensity laser (HIL) 328, which may be a laser such as is described with regard to any of the preceding figures. One or more optical elements 330 (e.g., lenses, mirrors, refractors, diffractors, etc.) directs the laser into a conical shape to generate the waveguide. An energy storage component 332 (e.g., solar cells, thin-film solar energy storage, or any other suitable solar energy storage device or mechanism) stores solar energy from solar rays 114 that enter the aperture 116 of the waveguide 112 and are internally reflected down to the energy storage component.

In one embodiment, the system 320 further comprises a user interface (e.g., a computer or the like) into which a user inputs waveguide parameter information, such as a desired height, volume, and/or cone half angle for a conical waveguide. The processor 324 receives the user input waveguide parameters and accesses a lookup table in the memory 326 to identify appropriate laser output power levels (e.g., a first power level for generating the waveguide and a second power level for maintaining the waveguide), appropriate optical element positions and/or orientations (e.g., depending on cone angle, waveguide height and/or volume, etc.), etc. In another example, the user inputs a desired amount of power or energy and the processor determines an appropriate waveguide height, volume, etc. to collect the desired amount of solar energy in a given time period.

In another embodiment, the system 320 comprises one or more sensors 336, such as a luminosity sensor, that senses ambient luminosity (e.g., solar radiation intensity or the like) and provides a signal indicative thereof to the processor 324 and/or to the user via the user interface 334. If the sensed or detected luminosity is greater than or equal to a predetermined threshold level, then the processor initiates generation of the waveguide. If the detected luminosity is below the predetermined threshold level (e.g., on a cloudy day, at night, etc.), then the processor does not initiate the waveguide or terminates an existing waveguide to save energy costs associated with operating the HIL 328.

In another embodiment, the solar energy storage component 332 includes a connector 338 for transferring stored electricity to a vehicle, device, power grid, etc. The connector 338 may be adaptable or adjustable to accommodate transferring stored solar energy to a plurality of different vehicles, devices and/or power grid connections.

In another embodiment, the system 320 is scaled down to permit a user to quickly collect, store, and transfer electricity to a small vehicle (e.g., a hybrid or electric car), a cell phone, PDA, laptop, or other small device. For instance, the system 320 may be deployed on top of an electric vehicle, and a waveguide can be generated during periods of high ambient solar radiation to maintain an electricity store for the vehicle.

According to an example, the plasma sheet waveguide 112 has a thickness of approximately 2-40 microns. In another example, the waveguide is approximately 5-20 microns thick. In yet another example, the waveguide has a cone half angle of approximately 1-10 degrees.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A system that facilitates concentrating and collecting solar energy, comprising:
    a high-intensity laser that generates a plasma sheet waveguide of a predetermined height and volume;
    one or more optical elements that direct laser light emitted from the high-intensity laser to form the plasma sheet waveguide;
    a solar energy storage component, positioned at the base of the plasma sheet waveguide, that receives solar energy internally reflected within the plasma sheet waveguide;
    wherein the high-intensity laser emits laser light at a first output power level that heats a thin layer of atmosphere to a predetermined temperature to generate the plasma sheet waveguide, and emits the laser at a second output power level to maintain the plasma sheet waveguide at a predetermined temperature differential relative to surrounding atmosphere.

2. The system of claim 1, wherein the first output power level is greater than the second output power level.

3. The system of claim 1, wherein the plasma sheet waveguide is generally conical in shape, having a base that receives solar rays at a predetermined height, and tapering down to an aperture through which collected and internally reflected solar rays are passed to the solar energy storage component.

4. The system of claim 3, wherein the solar energy storage component comprises one or more photovoltaic cells that store the solar energy.

5. The system of claim 3, wherein the plasma sheet waveguide has a cone half angle of approximately 2°.

6. The system of claim 1, wherein the plasma sheet waveguide has a thickness of at least 5 microns.

7. The system of claim 1, wherein the high-intensity laser is a high-intensity ultraviolet (UV) laser.

8. The system of claim 1, wherein the high-intensity laser is a high-intensity pulse laser.

9. The system of claim 1, wherein the high-intensity laser is a high-intensity continuous wave laser.

10. The system of claim 1, wherein the solar energy storage component comprises a connector suitable for providing stored solar energy to a device or vehicle.

11. The system of claim 1, wherein the one or more optical elements comprises at least one of a mirror or a lens.

12. The system of claim 1, further comprising a user interface that comprises:
    a user input device into which a user enters information related to plasma sheet waveguide parameters, the parameters including one or more of height, volume, cone half angle, thickness, and duration;
    a memory that stores a lookup table comprising information related to waveguide control parameters, including one or more of laser output power, optical element orientation
    a processor that receives waveguide parameter information from the user input device, accesses the lookup table to identify waveguide control parameter information corresponding to the received waveguide parameter information, and executes computer-executable instructions to control the high-intensity laser and generate the plasma sheet waveguide as a function of the waveguide control parameter information.

13. The system of claim 12, wherein the optical elements comprise one or more of a lens and a mirror.

14. The system of claim 12, further including a luminosity sensor that provides a signal to the processor to generate or maintain the plasma sheet waveguide when detected ambient luminescence is greater than or equal to a predetermined threshold level, and to terminate the plasma sheet waveguide when the detected ambient luminescence is less than the predetermined threshold.

* * * * *